United States Patent
Wojcik et al.

(10) Patent No.: US 10,100,673 B2
(45) Date of Patent: Oct. 16, 2018

(54) PUMP GEAR

(71) Applicant: Hamilton Sundstrand Corporation, Charlotte, NC (US)

(72) Inventors: Craig J. Wojcik, Frankfort, IL (US); Andrew P. Grosskopf, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 494 days.

(21) Appl. No.: 14/846,210

(22) Filed: Sep. 4, 2015

(65) Prior Publication Data

US 2017/0067367 A1    Mar. 9, 2017

(51) Int. Cl.
| | |
|---|---|
| *F01D 15/08* | (2006.01) |
| *F01D 15/10* | (2006.01) |
| *F01D 15/12* | (2006.01) |
| *F01D 25/20* | (2006.01) |
| *F02C 7/275* | (2006.01) |
| *F02C 7/32* | (2006.01) |

(52) U.S. Cl.
CPC ............. *F01D 25/20* (2013.01); *F01D 15/08* (2013.01); *F01D 15/10* (2013.01); *F01D 15/12* (2013.01); *F02C 7/275* (2013.01); *F02C 7/32* (2013.01); *Y02T 50/671* (2013.01)

(58) Field of Classification Search
CPC .......... F01D 15/08; F01D 15/10; F01D 15/12; F01D 25/20; F01D 2220/32
See application file for complete search history.

(56) References Cited

U.S. PATENT DOCUMENTS

| | | | | |
|---|---|---|---|---|
| 3,004,450 | A | * 10/1961 | Garnier | ................... F16H 47/04 475/76 |
| 3,489,035 | A | * 1/1970 | Giles | ....................... F16H 47/04 418/31 |
| 4,252,035 | A | 2/1981 | Cordner et al. | |
| 4,284,913 | A | 8/1981 | Barnhardt | |
| 4,315,442 | A | * 2/1982 | Cordner | .................. F02C 7/268 123/179.1 |
| 4,609,842 | A | * 9/1986 | Aleem | ................. H02K 7/1807 310/112 |
| 4,734,590 | A | 3/1988 | Fluegel | |

(Continued)

FOREIGN PATENT DOCUMENTS

JP         2014005794 A  *  1/2014  ................ F04C 2/10

*Primary Examiner* — Jacob S. Scott
*Assistant Examiner* — Tinh Dang
(74) *Attorney, Agent, or Firm* — Kinney & Lange, P.A.

(57) ABSTRACT

An integrated drive generator includes an input shaft and an input drive gear connected to the input shaft. The integrated drive generator also includes an input driven gear meshed with the input drive gear. The integrated drive generator also includes a hydraulic speed trimming device. The hydraulic speed trimming device includes an input shaft connected to the input driven gear, an output shaft, an accessory drive gear connected to the output shaft, and an output ring gear connected to the output shaft. The input driven gear, the accessory drive gear, and the output ring gear are coaxial and disposed proximate a first end of the hydraulic speed trimming device. The integrated drive generator also includes a pump assembly with a pump drive shaft and a pump gear connected to the pump drive shaft and meshed with the accessory drive gear.

9 Claims, 6 Drawing Sheets

(56) References Cited

U.S. PATENT DOCUMENTS

| | | | |
|---|---|---|---|
| 4,825,899 A * | 5/1989 | Niggermann | F16H 57/0427 |
| | | | 137/334 |
| 4,953,663 A | 9/1990 | Sugden | |
| 5,028,803 A | 7/1991 | Reynolds | |
| 9,154,011 B2 * | 10/2015 | Vanderzyden | H02K 5/04 |
| 2013/0288840 A1 | 10/2013 | Grosskopf et al. | |
| 2014/0007741 A1 | 1/2014 | Vanderzyden et al. | |
| 2014/0008170 A1 | 1/2014 | Vanderzyden et al. | |
| 2014/0009125 A1 | 1/2014 | Vanderzyden et al. | |
| 2014/0009126 A1 | 1/2014 | Vanderzyden et al. | |

* cited by examiner

PUMP GEAR

BACKGROUND

This disclosure is directed generally to an integrated drive generator for use with an aircraft gas turbine engine, and more specifically, to an oil pump assembly of an integrated drive generator.

Integrated drive generators have been in use for many years in generating electrical power on airframes. An integrated drive generator functions to produce a constant three-phase 400 Hz alternating current when driven by a variable speed gearbox located on an airframe propulsion engine, generally a gas turbine engine. The integrated drive generator is a single unit that includes a hydraulic speed trimming device and an alternating current generator mounted within a case assembly. The hydraulic speed trimming device converts a variable speed shaft input from a gearbox on a gas turbine engine to a constant speed shaft output to drive the alternating current generator.

The integrated drive generator also generally includes a scavenge pump, an inversion pump, and a charge pump disposed within the case assembly of the integrated drive generator. The scavenge pump draws oil from an oil sump located in the bottom of the case and supplies the oil to a filter which removes various debris within the oil prior to entering the cooling circuit located external to the integrated drive generator on the aircraft. The output of the deaerator, which contains oil of higher quality than that pumped by the scavenge pump, is applied to the intake of the charge pump. The charge pump pressurizes the oil and applies the oil to an oil circuit. The oil circuit supplies oil to the hydraulic speed trimming device, to the alternating current generator for cooling and lubricating the alternating current generator, to the casing of the integrated drive generator for cooling, and to other components of the integrated drive generator that require oil circulation for cooling and/or lubrication. Generally, an assembly of gears is used to mechanically connect the scavenge pump, the inversion pump, and charge pump to the output of the hydraulic speed trimming device.

Should any part of the integrated drive generator require maintenance or replacement, an operator generally must open the case assembly and at least partially disassemble the integrated drive generator. Reducing the complexity of the integrated drive generator results in maintenance cost savings by reducing the amount of parts to maintain within the integrated drive generator and the amount of time required to disassemble and reassemble the integrated drive generator. Reducing the complexity of the integrated drive generator also results in manufacturing cost savings by reducing the number of parts needed to produce the integrated drive generator and the time required to assemble the integrated drive generator.

SUMMARY

In one aspect of the invention, an integrated drive generator includes an input shaft and an input drive gear connected to the input shaft. The integrated drive generator also includes an input driven gear meshed with the input drive gear. The integrated drive generator also includes a hydraulic speed trimming device. The hydraulic speed trimming device includes an input shaft connected to the input driven gear, an output shaft, an accessory drive gear connected to the output shaft, and an output ring gear connected to the output shaft. The input driven gear, the accessory drive gear, and the output ring gear are coaxial and disposed proximate a first end of the hydraulic speed trimming device. The integrated drive generator also includes a pump assembly with a pump drive shaft and a pump gear connected to the pump drive shaft and meshed with the accessory drive gear.

In another aspect of the invention, a pump gear for rotating a drive shaft of a pump assembly of an integrated drive generator for a gas turbine engine includes an outside diameter and a pitch diameter. A ratio of the outside diameter and the pitch diameter is about 1.027 to about 1.029.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides an integrated drive generator for use with a gas turbine engine. The integrated drive generator includes a pump assembly with a pump cover and a pump sleeve that house a charge pump, a scavenge pump, and an inversion pump within the integrated drive generator. The pump cover and pump sleeve simplify the assembly of the integrated drive generator by congregating the charge pump, the scavenge pump, and the inversion pump into a single unit that requires fewer attachment components than prior art assemblies to connect the charge pump, the scavenge pump, and the inversion pump within the integrated drive generator. Furthermore, aligning the charge pump, the scavenge pump, and the inversion pump within the pump sleeve and the pump cover provides for fewer gears and other moving parts within the integrated drive generator. Reducing the number of gears and other moving parts within integrated drive generator increases the service life of integrated drive generator by reducing the amount of internal vibration and the wear and tear associated with internal vibration.

Figure 1:
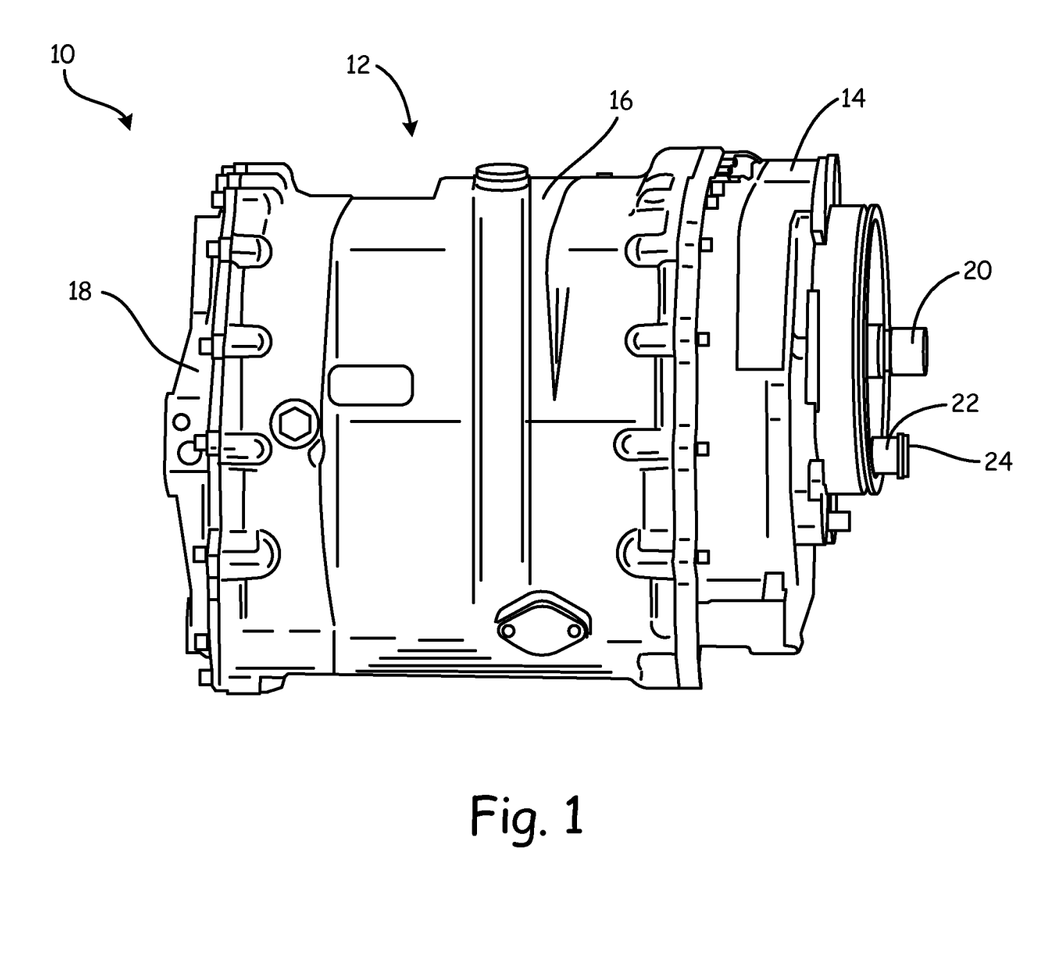
FIG. 1 is a perspective view of an integrated drive generator.
Figure 2:
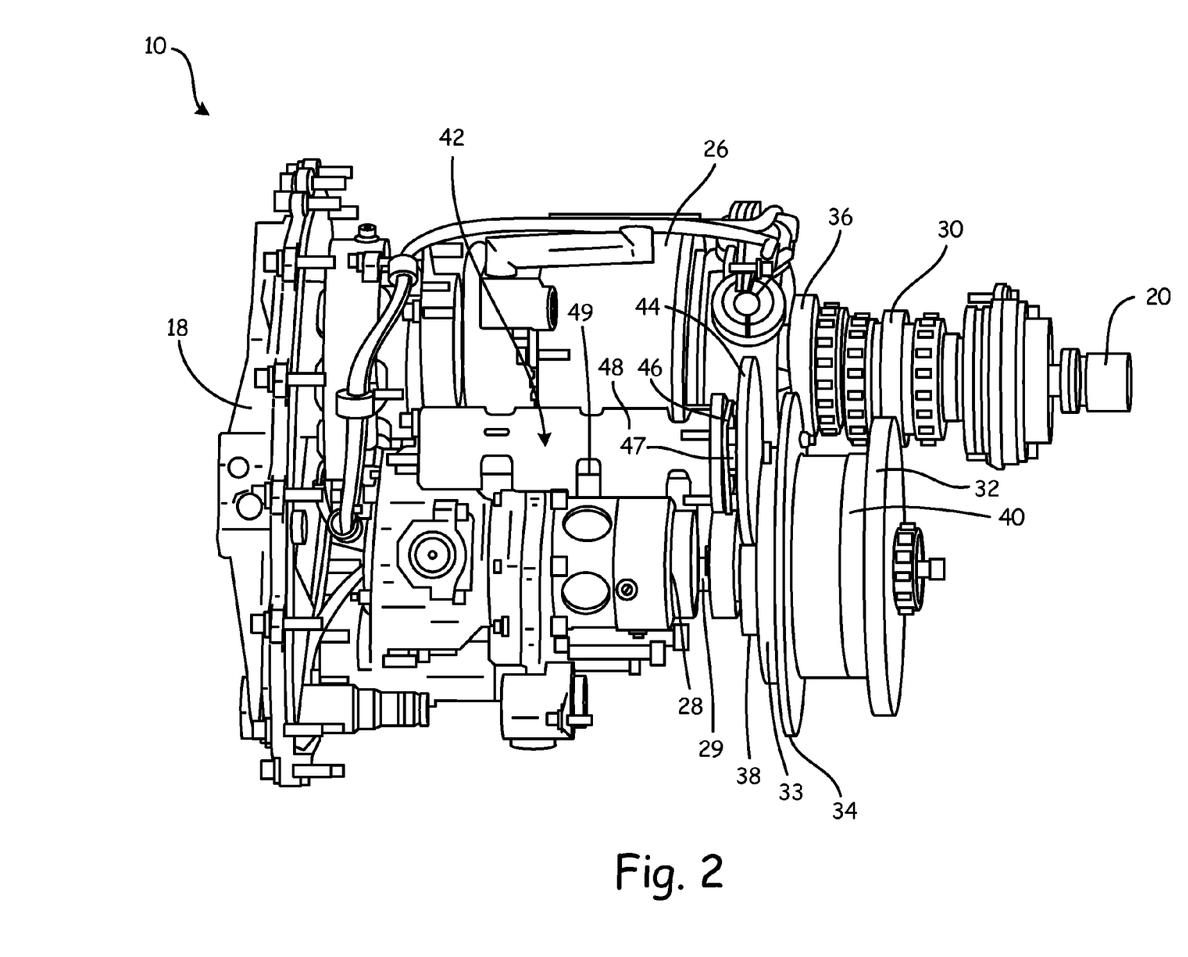
FIG. 2 is a perspective view of the integrated drive generator of FIG. 1 with a housing assembly removed.

FIGS. 1-2 will be discussed concurrently. FIG. 1 is a perspective view of integrated drive generator (IDG) 10 with housing assembly 12. As shown in FIG. 1, housing assembly 12 can include input housing 14, center housing 16, and end housing 18. FIG. 2 is a perspective view of IDG 10 of FIG. 1 with input housing 14 and center housing 16 of housing assembly 12 removed. In addition to housing assembly 12, IDG 10 can also include variable speed input shaft 20, oil outlet 22, oil inlet 24, generator 26, hydraulic speed trimming device 28, input drive gear 30, input driven gear 32, output ring gear 34, generator driven gear 36, accessory drive gear 38, differential 40, and pump assembly 42. Pump assembly 42 can include pump gear 44, pump cover 46, pump drive shaft 47, pump sleeve 48, and pump interior components 49.

Generator 26, hydraulic speed trimming device 28, and pump assembly 42 are all contained within housing assembly 12. As shown in FIG. 1, housing assembly 12 is assembled around generator 26, hydraulic speed trimming device 28 and pump assembly 42 by connecting center housing 16 between input housing 14 and end housing 18. Variable speed input shaft 20 extends across input housing 14 and into the interior of IDG 10. An end of variable speed input shaft 20, disposed outside of housing assembly 12, interfaces with a gearbox on a gas turbine engine such that the gearbox on the gas turbine engine rotates variable speed input shaft 20 at a variable speed. Input drive gear 30 is disposed within housing assembly 12 and is mechanically connected to variable speed input shaft 20 such that variable speed input shaft 20 rotates input drive gear 30 at a variable speed. Input driven gear 32 is disposed within housing assembly 12 and is meshed with input drive gear 30 such that input drive gear 30 rotates input driven gear 32 at a variable speed. As input drive gear 30 rotates input driven gear 32, input driven gear 32 causes a rotation to (not shown), internal to differential 40, which rotates a variable coaxial shaft (not shown) of hydraulic speed trimming device 28 at a variable speed. Hydraulic speed trimming device 28 uses the variable input speed of the variable coaxial shaft (not shown) to trim the variable speed which results in the fixed coaxial shaft 29 rotating to adjust the speed of a sun gear (not shown). The sun gear (not shown) interacts with planet gears (not shown) mounted in the carrier shaft to rotate the output ring gear at a constant speed. Fixed coaxial shaft 29 is disposed around variable coaxial shaft (not shown) such that fixed coaxial shaft 29 is coaxial with variable coax shaft (not shown).

A mounting bracket 33 is attached to output ring gear 34. Accessory drive gear 38 is connected to mounting bracket 33. Hydraulic speed trimming device 28 in conjunction with the differential 40 rotates the output ring gear 34, accessory drive gear 38 and generator driven gear 36 at a constant speed. As shown in FIG. 2, differential 40 can be disposed axially between output ring gear 34 and input driven gear 32. Differential 40 can also mechanically connect input driven gear 32 to variable coaxial shaft (not shown) which is concentric with the fixed coaxial shaft 29. Output ring gear 34 can be disposed between differential 40 and accessory drive gear 38. Accessory drive gear 38, output ring gear 34, and input driven gear 32 can be coaxial and can all be disposed on the same side or end of hydraulic speed trimming device 28. Coaxially aligning accessory drive gear 38, output ring gear 34, and input driven gear 32 within IDG 10 can help reduce the overall size of IDG 10. Positioning accessory drive gear 38, output ring gear 34, and input driven gear 32 on the same side or end of hydraulic speed trimming device 28 reduces the total size of the IDG 10 while ensuring the variable input speed is trimmed to output a fixed speed for output ring gear 34. Should an operator need to inspect or perform maintenance on accessory drive gear 38, output ring gear 34, and input driven gear 32, the operator need only remove a portion of housing assembly 12, such as input housing 14, to access accessory drive gear 38, generator driven gear 36, and input driven gear 32.

Generator driven gear 36 meshes with output ring gear 34 such that output ring gear 34 rotates generator driven gear 36 at a constant speed. Generator driven gear 36 is connected to a rotor (not shown) of generator 26 which rotates at a constant speed due to the interaction of output ring gear 34 and generator driven gear 36. Generator 26 can be an alternating current electrical generator.

Accessory drive gear 38 can mesh with pump gear 44 such that accessory drive gear 38 rotates pump gear 44 at a constant speed. Pump gear 44 is connected to pump drive shaft 47 such that pump drive shaft 47 rotates in unison with pump gear 44. The rotation of pump drive shaft 47 spins pump interior components 49 of pump assembly 42 such that pump assembly 42 can circulate oil within IDG 10, out of IDG 10 through oil outlet 22, and back into IDG 10 through oil inlet 24. As discussed below with reference to FIGS. 3-6, pump sleeve 48 at least partially houses pump interior components 49 of pump assembly 42 into a relatively compact unit that is relatively simple to install inside housing assembly 12 of IDG 10.

Figure 3:
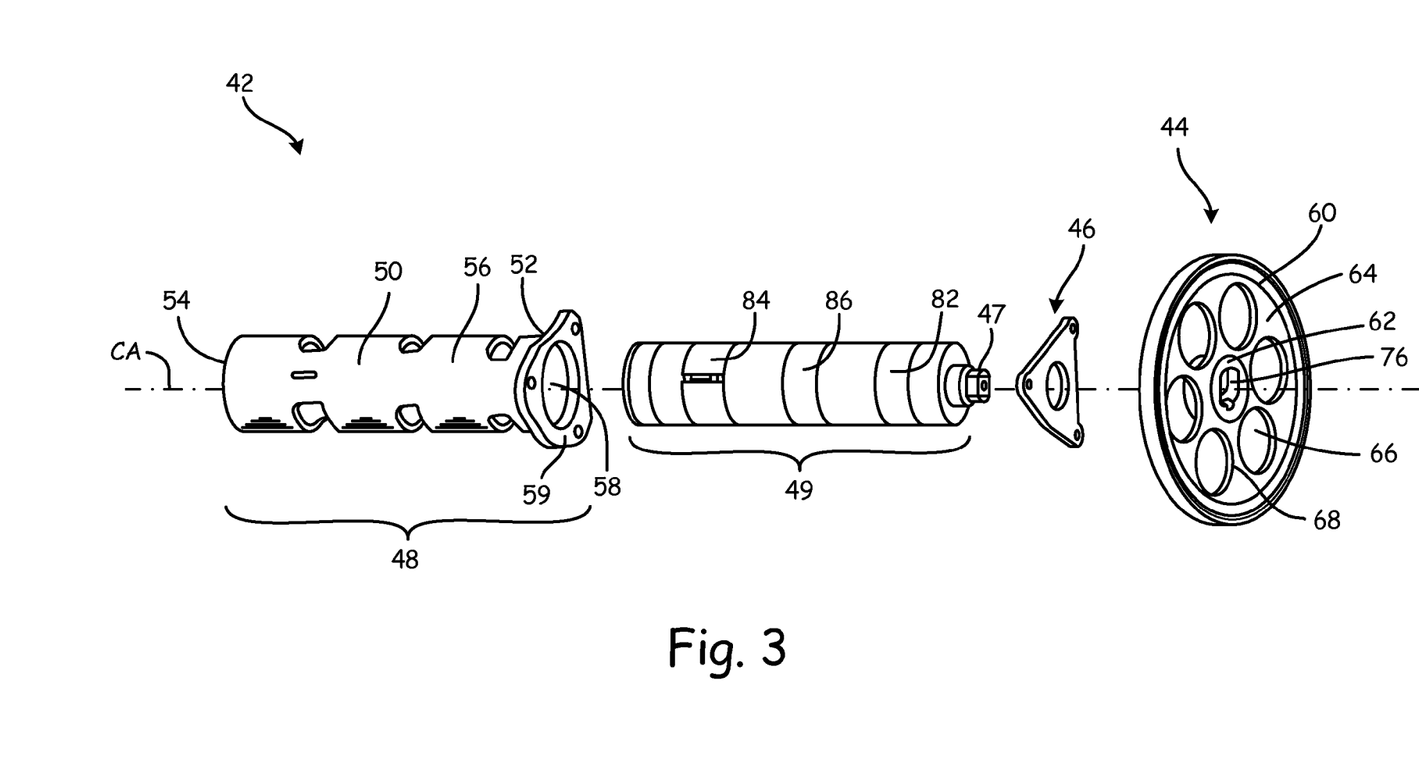
FIG. 3 is an exploded view of a pump assembly from the integrated drive generator of FIG. 2.
Figure 4:
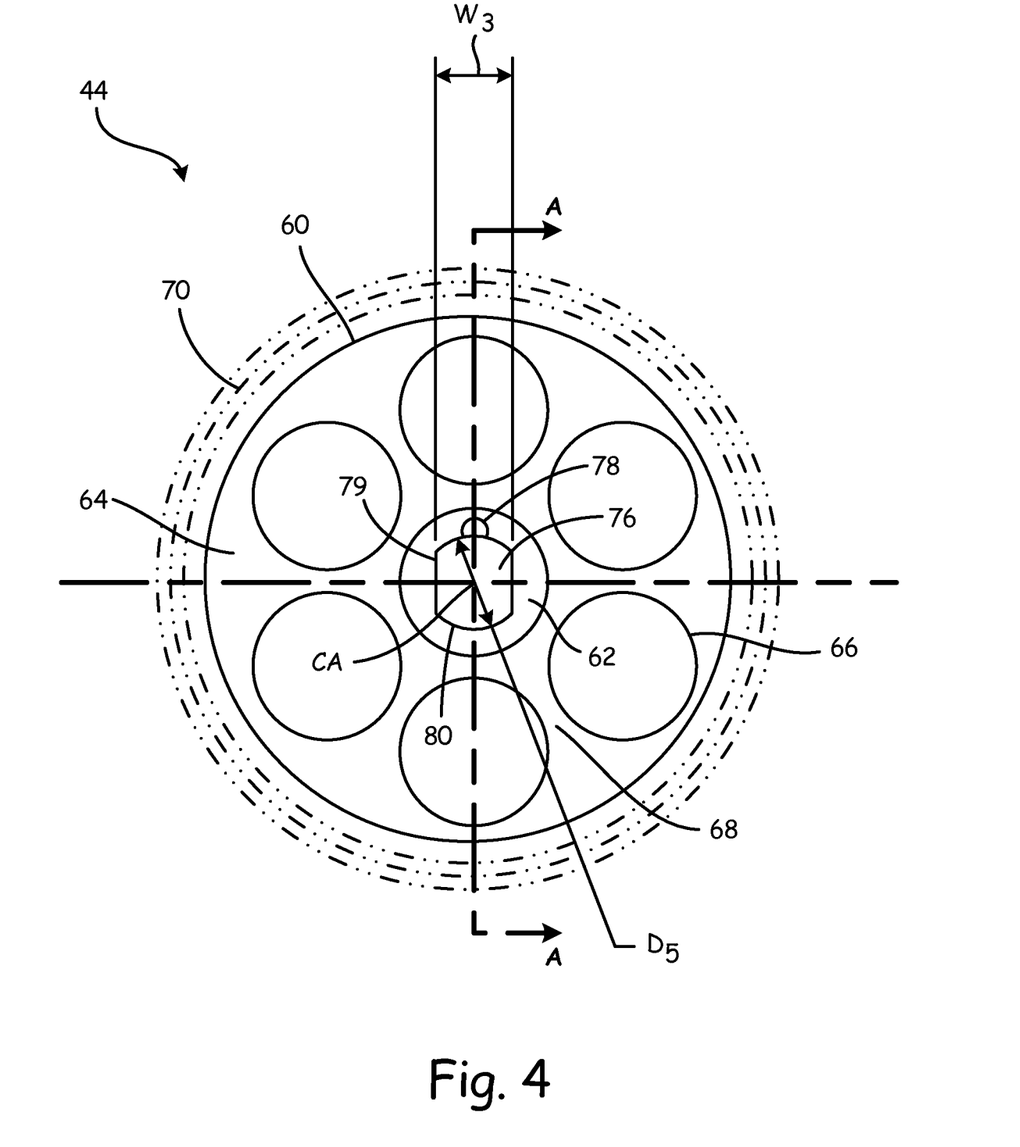
FIG. 4 is a plan view of a pump gear from the pump assembly of FIG. 3.
Figure 5:
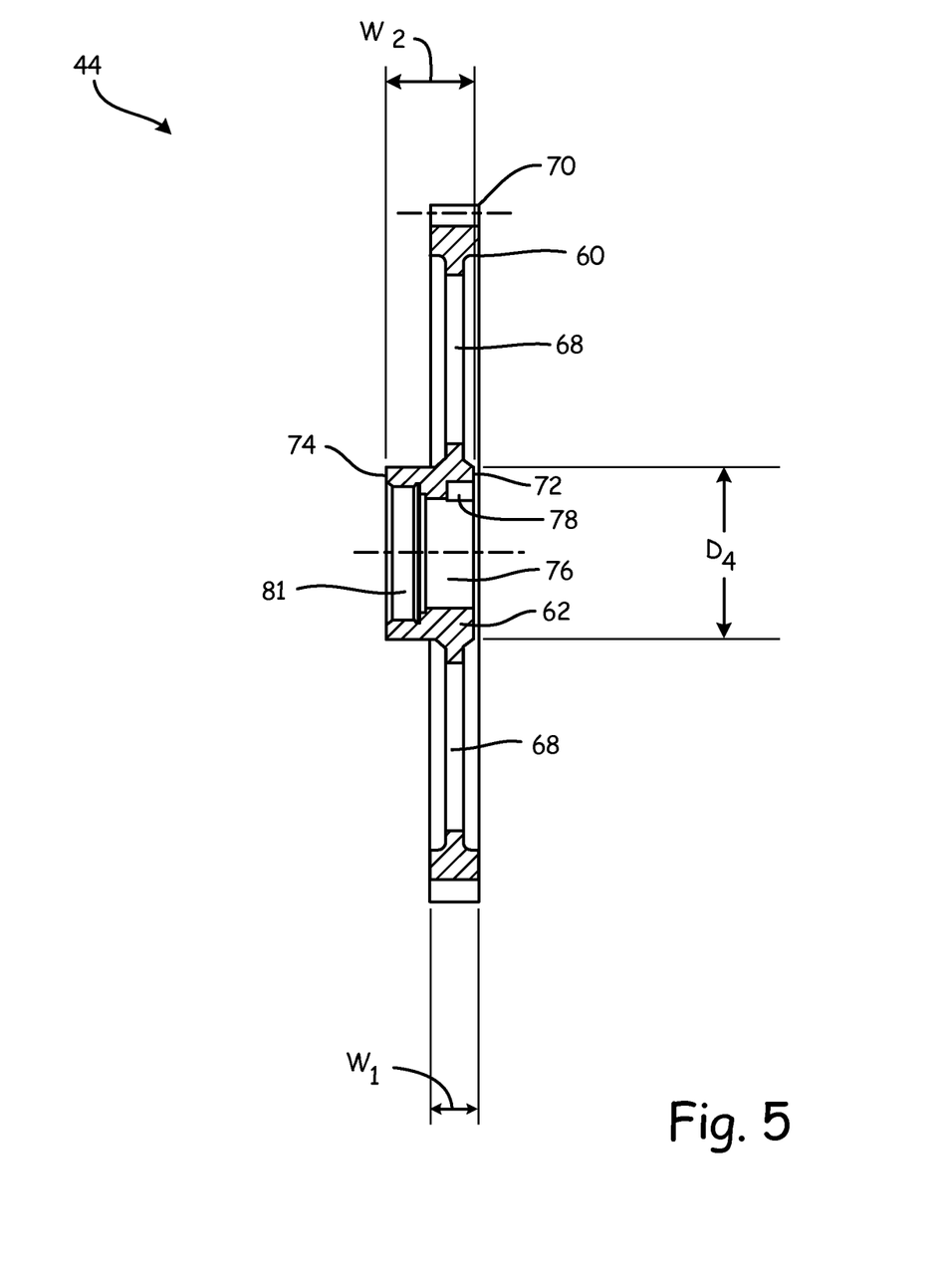
FIG. 5 is a cross-sectional view of the pump gear of FIG. 4 taken along line A-A.
Figure 6:
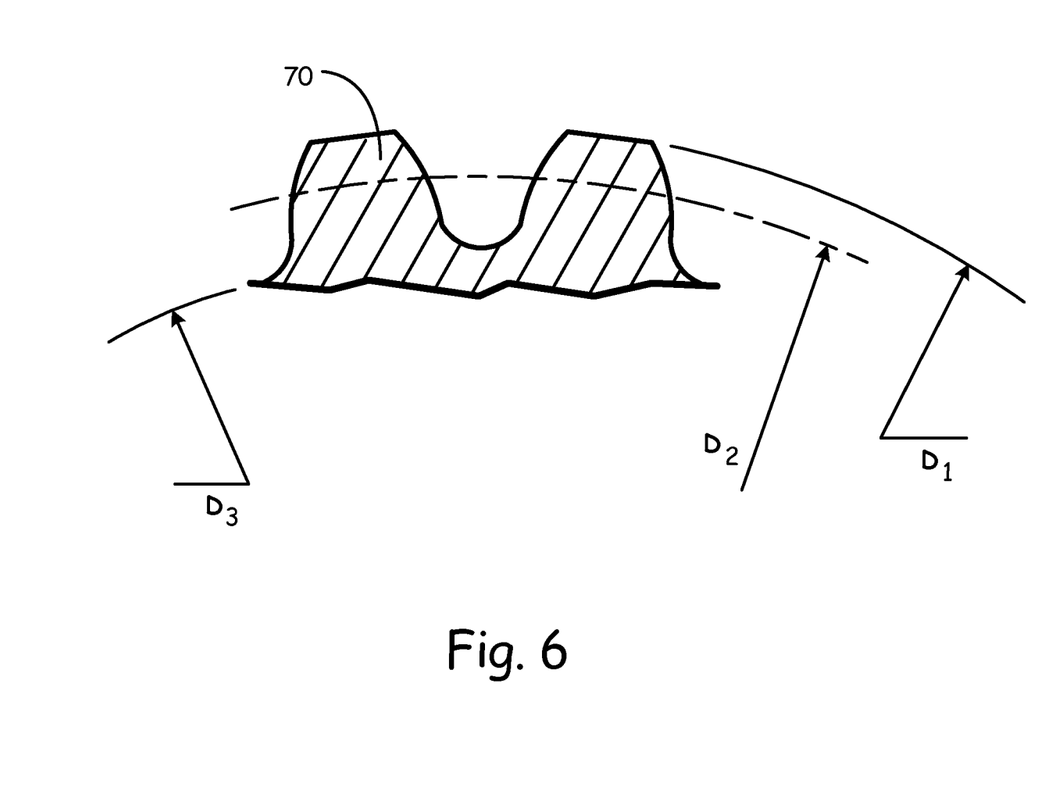
FIG. 6 is a cross-sectional view of the pump gear teeth of FIG. 5.

FIGS. 3-6 will be discussed concurrently. FIG. 3 is an exploded view of pump assembly 42 along center axis CA of pump assembly 42. As shown in FIG. 3, pump gear 44, pump cover 46, pump sleeve 48, and pump interior components 49 all share center axis CA. FIG. 4 is a plan view of pump gear 44 from pump assembly 42 of FIG. 3. FIG. 5 is a cross-sectional view of pump gear 44 taken along line A-A in FIG. 4. FIG. 6 is a cross-sectional view of pump gear teeth 70. As shown in FIG. 3, pump sleeve 48 can include tubular body 50. Tubular body 50 can include first end 52, second end 54, outside surface 56, inside surface 58, and center axis CA. First end 52 of tubular body 50 can include mounting flange 59 to help connect the entire pump assembly 42 to IDG 10. As shown in FIGS. 3-6, pump gear 44 can include rim 60 with teeth 70 (represented by three dashed lines—outside diameter $D_1$, pitch diameter $D_2$, and root diameter $D_3$), center hub 62, webbing 64, a plurality of holes 66, spokes 68, outside diameter $D_1$, pitch diameter $D_2$, and root diameter $D_3$. Teeth 70 can include teeth axial width $W_1$. Center hub 62 can include hub outer diameter $D_4$, hub first side 72, hub second side 74, hub axial width $W_2$, hub center hole 76, and slot 78. Hub center hole 76 can include flat sides 79, round sides 80, hub hole width $W_3$, hub hole diameter $D_5$, and expanded region 81. Pump interior components 49, shown in FIG. 3, can include charge pump 82, scavenge pump 84, and inversion pump 86.

Tubular body 50 extends from first end 52 to second end 54 along center axis CA. Center axis CA can be the center axis for tubular body 50, pump sleeve 48, pump cover 46, pump gear 44, and the rest pump assembly 42. Pump sleeve 48 can be formed from metal material, such as steel, titanium, aluminum, alloys, super alloys, and/or other various types of metals. First end 52 of tubular body 50 can be open so that charge pump 82, scavenge pump 84, and inversion pump 86 can be inserted into pump sleeve 48 to form a stack of pumps inside pump sleeve 48.

Each of charge pump 82, scavenge pump 84, and inversion pump 86 can individually be a rotary vane pump. When pump interior components 49 are assembled within pump sleeve 48, as shown in FIG. 3, inversion pump 86 is disposed axially between scavenge pump 84 and charge pump 82, with scavenge pump 84 disposed proximate second end 54 of tubular body 50 and charge pump 82 disposed proximate first end 52 of tubular body 50.

Pump cover 46 is removably connected to mounting flange 59 on first end 52 of tubular body 50 to retain charge pump 82, scavenge pump 84, and inversion pump 86 within pump sleeve 48. Keeping charge pump 82, scavenge pump 84, and inversion pump 86 retained and tightly stacked within pump sleeve 48 helps reduce vibration, wear, and fluid flow inefficiency of pump assembly 42. Mounting flange 59 and pump cover 46 can be used to connect pump assembly 42 to interior walls (not shown) formed on center housing 16 of housing assembly 12 (shown in FIG. 1).

Pump drive shaft 47 is connected to charge pump section 82, scavenge pump 84, and inversion pump 86 and can extend through pump cover 46 to connect with pump gear 44. During operation, pump gear 44 delivers torque to pump drive shaft 47 from accessory drive gear 38 (shown in FIG. 2) to rotate the vanes of charge pump 82, scavenge pump 84, and inversion pump 86 at a constant speed.

As shown in FIGS. 3-5, pump gear 44 can be a spur gear. Rim 60 of pump gear 44 is positioned radially outward from center hub 62, and webbing 64 can extend between rim 60 and center hub 62. The plurality of holes 66, which can be six in number as shown in FIGS. 3-4, can be formed in webbing 64 to reduce the weight of pump gear 44 and to form spokes 68 between rim 60 and center hub 62. The plurality of holes 66 and spokes 68 can be distributed around center axis CA so as to balance the weight of pump gear 44 about center axis CA and prevent pump gear 44 from resonating or vibrating during operation. Pump gear 44 can be formed from metal material, such as steel, titanium, alloys, super alloys, and/or other various types of metals.

Hub center hole 76 extends through the center of hub 62 along center axis CA of pump gear 44, as shown best in FIGS. 4 and 5. Hub center hole 76 can include a double D cross-sectional profile with two flat sides 79 and two rounded sides 80. Flat sides 79 can be disposed radially across from one another. Hub hole width $W_3$ represents the distance between flat sides 79. Rounded sides 80 can be disposed radially across from one another and hub hole diameter $D_5$ can represent the distance between rounded sides 80. Pump drive shaft 47 (shown in FIG. 3), can also include a double D cross-sectional profile that corresponds with flat sides 79 and rounded sides 80 of hub center hole 76, thereby allowing pump drive shaft 47 to mesh with pump gear 44. When pump gear 44 is assembled onto pump drive shaft 47, the double D cross-sectional profile of drive shaft 47 and hub center hole 76, along with a fastener (not shown) and keyed washer (not shown), will help prevent pump gear 44 from slipping while, at the same time, allowing pump drive shaft 47 to rotate such that pump gear 44 can transfer torque to pump drive shaft 47. Slot 78 can be formed in hub 62 proximate one of rounded sides 80 of center hole 76 and can be configured to receive a keyed washer (not shown) secured by a fastener (not shown) for connecting pump gear 44 to pump drive shaft 47.

Pump gear 44 can be sized and optimized to maximize the efficiency of pump assembly 42. Shown best in FIG. 6, outside diameter $D_1$, pitch diameter $D_2$, and root diameter $D_3$ of pump gear 44 are some of the dimensions of pump gear 44 that can be sized to maximize the performance of pump assembly 42 and the overall performance of IDG 10. Outside diameter $D_1$ of pump gear 44 can be defined as the diameter of the circle that contains the tops of teeth 70 of pump gear 44. Pitch diameter $D_2$ can be defined as the diametral position on pump gear 44 where the circular tooth thickness, pressure angle and helix angles of teeth 70 are defined. Root diameter $D_3$ can be defined as the diameter of gear 44 measured at the base of teeth 70, or in other words, twice the distance between center axis CA and the base of teeth 70. A ratio ($D_1/D_2$) of outside diameter $D_1$ and pitch diameter $D_2$ can be about 1.027 to about 1.029. Optimizing the ratio ($D_1/D_2$) of outside diameter $D_1$ and pitch diameter $D_2$ ensures that pump gear 44 is large enough to bridge the space between pump drive shaft 47 and accessory drive gear 38 (shown in FIG. 2) while still providing sufficient space to accommodate teeth 70 of pump gear 44. A ratio ($D_3/D_2$) of root diameter $D_3$ and pitch diameter $D_2$ can be about 0.957 to about 0.962. Optimizing the ratio ($D_3/D_2$) of root diameter $D_3$ and pitch diameter $D_2$ further defines the space needed to accommodate teeth 70 on pump gear 44. Teeth 70 of pump gear 44 can be at least seventy teeth in number. While FIG. 6 only provides a partial view of pump gear 44, it should be understood that the features of pump gear 44 shown in FIG. 6 are repeated throughout the entire circumference of pump gear 44 and to all of teeth 70 of pump gear 44.

In addition to outside diameter $D_1$, pitch diameter $D_2$, and root diameter $D_3$, hub outer diameter D4, hub hole diameter D5, axial width W1 of teeth 70, and hub axial width W2 are additional dimensions of pump gear 44 that can be sized to maximize the performance of pump gear 44 and pump assembly 42. As best shown in FIG. 5, a ratio ($D_4/D_1$) of hub outer diameter $D_4$ and outside diameter $D_1$ of pump gear 44 can be about 0.242 and 0.251. Optimizing the ratio ($D_4/D_1$) of hub outer diameter $D_4$ and outside diameter $D_1$ of pump gear 44 helps define the most efficient length for spokes 68 and the most efficient size for center hub 62. Properly sizing spokes 68 will help ensure that spokes 68 are strong enough to transfer torque between rim 60 and center hub 62. Properly sizing center hub 62 helps ensure that center hub 62 is robust enough to withstand the operational stresses of pump assembly 42 while ensuring that center hub 62 is not unnecessarily oversized. Oversizing center hub 62 can unnecessarily add weight to pump assembly 42, IDG 10, and the aircraft that utilizes IDG 10, thus leading to decreased fuel efficiency and increased fuel cost.

As shown in FIGS. 4 and 5, a ratio ($D_5/D_4$) of hub hole diameter $D_5$ and hub outer diameter $D_4$ can be about 0.622 to about 0.647. Optimizing the ratio ($D_5/D_4$) of hub hole diameter $D_5$ and hub outer diameter $D_4$ also helps ensure that center hub 62 is robust enough to withstand the operational stresses of pump assembly 42 while ensuring that center hub 62 is not unnecessarily oversized.

Best shown in FIG. 5, a ratio ($W_1/W_2$) of axial width $W_1$ of teeth 70 and hub axial width $W_2$ can be about 0.532 to about 0.580. By optimizing the ratio ($W_1/W_2$) of axial width $W_1$ of teeth 70 and hub axial width $W_2$ the size of pump gear 44 is large enough in the direction of center axis CA to help teeth 70 on pump gear 44 maintain contact with accessory drive gear 38 (shown in FIG. 2) and resist deformation during operation of IDG 10.

In view of the foregoing description, it will be recognized that the present disclosure provides numerous advantages and benefits. For example, the present disclosure provides coaxially aligned accessory drive gear 38, output ring gear 34, and input driven gear 32 all disposed on the same side or end of hydraulic speed trimming device 28. Coaxially aligning accessory drive gear 38, output ring gear 34, and input driven gear 32 within IDG 10 can help reduce the overall size of IDG 10 by moving the accessory drive gear 38, output ring gear 34, and input driven gear 32 into a smaller space. Reducing the overall size of IDG 10 helps improve the fuel efficiency of any aircraft that incorporates IDG 10 by reducing the overall weight of the aircraft. Positioning accessory drive gear 38, output ring gear 34, and input driven gear 32 on the same side or end of hydraulic speed trimming device 28 can also help improve maintenance accessibility of accessory drive gear 38, output ring gear 34, and input driven gear 32. Should an operator need to inspect or perform maintenance on accessory drive gear 38, output ring gear 34, and input driven gear 32, the operator need only remove a portion of housing assembly 12, such as input housing 14, to access accessory drive gear 38, generator driven gear 36, and input driven gear 32.

The present disclosure also provides IDG 10 with pump assembly 42 with charge pump 82, scavenge pump 84, and inversion pump 86 all disposed within pump sleeve 48. Charge pump 82, scavenge pump 84, and inversion pump 86 can all be installed into IDG 10 by simply connecting pump cover 46 and mounting flange 59 of pump sleeve 48 within housing assembly 12 of IDG 10. Thus pump assembly 42 and IDG 10 overall use fewer fasteners and less area than IDG designs. Furthermore, aligning charge pump 82, scavenge pump 84, and inversion pump 86 within pump sleeve 48 and pump cover 46 provides for fewer gears and other moving parts within IDG 10. Reducing the number of gears and other moving parts within IDG 10 increases the service life of IDG 10 by reducing the amount of internal vibration within IDG 10, amount of hardware, and the wear and tear associated with internal vibration. Reducing the number of gears and other moving parts within IDG 10 also reduces the weight of IDG 10 and increases the fuel efficiency of any aircraft that incorporates IDG 10. The present disclosure also provides gear pump 44 with a size optimized for size and weight savings while maintaining the structural integrity of pump gear 44.

The following are non-exclusive descriptions of possible embodiments of the present invention.

In one embodiment, an integrated drive generator includes an input shaft and an input drive gear connected to the input shaft. The integrated drive generator also includes an input driven gear meshed with the input drive gear. The integrated drive generator also includes a hydraulic speed trimming device. The hydraulic speed trimming device includes an input shaft connected to the input driven gear, an output shaft, an accessory drive gear connected to the output shaft, and an output ring gear connected to the output shaft. The input driven gear, the accessory drive gear, and the output ring gear are coaxial and disposed proximate a first end of the hydraulic speed trimming device. The integrated drive generator also includes a pump assembly with a pump drive shaft and a pump gear connected to the pump drive shaft and meshed with the accessory drive gear.

The integrated drive generator of the preceding paragraph can optionally include, additionally and/or alternatively, any one or more of the following features, configurations and/or additional components:

the pump gear is a spur gear;

an outside diameter; and a pitch diameter, wherein a ratio of the outside diameter and the pitch diameter is about 1.027 to about 1.029;

a root diameter, wherein a ratio of the root diameter and the pitch diameter is about 0.957 to about 0.962;

a center hub, the center hub comprising: a hub outer diameter; and a hub hole extending through a center of the hub along a center axis of the pump gear, wherein a ratio of the hub outer diameter and the outside diameter of the pump gear is about 0.242 and 0.251;

the hub hole includes a double D cross-sectional profile with two flat sides and two rounded sides, wherein the two flat sides define a hub hole width and the two rounded sides define a hub hole diameter;

a ratio of the hub hole diameter and the hub outer diameter is about 0.622 to about 0.647;

the pump gear comprises at least seventy teeth;

a ratio of an axial width of the teeth and an axial width of the hub is about 0.532 to about 0.580; and/or the output ring gear is connected to the output shaft by a differential assembly disposed between the accessory drive gear and the input driven gear.

In another embodiment, a pump gear for rotating a drive shaft of a pump assembly of an integrated drive generator for a gas turbine engine includes an outside diameter and a pitch diameter. A ratio of the outside diameter and the pitch diameter is about 1.027 to about 1.029.

The pump gear of the preceding paragraph can optionally include, additionally and/or alternatively, any one or more of the following features, configurations and/or additional components:

a root diameter, wherein a ratio of the root diameter and the pitch diameter is about 0.957 to about 0.962;

a center hub, the center hub comprising: a hub outer diameter; and a hub hole extending through a center of the hub along a center axis of the pump gear, wherein a ratio of the hub outer diameter and the outside diameter of the pump gear is about 0.242 and 0.251;

the hub hole includes a double D cross-sectional profile with two flat sides and two rounded sides, wherein the two flat sides define a hub hole width and the two rounded sides define a hub hole diameter, and wherein a ratio of the hub hole diameter and the hub outer diameter is about 0.622 to about 0.647;

the pump gear comprises at least seventy teeth; and/or a ratio of an axial width of the teeth and an axial width of the hub is about 0.532 to about 0.580.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An integrated drive generator for a gas turbine engine, the integrated drive generator comprising:

an input shaft;

an input drive gear connected to the input shaft;
an input driven gear meshed with the input drive gear;
a hydraulic speed trimming device, the hydraulic speed trimming device comprising:
   an input shaft connected to the input driven gear;
   an output shaft;
   an accessory drive gear connected to the output shaft; and
   an output ring gear connected to the output shaft,
   wherein the input driven gear, the accessory drive gear, and the output ring gear are coaxial and disposed at a first end of the hydraulic speed trimming device;
a pump assembly comprising a pump drive shaft; and
a pump gear connected to the pump drive shaft and meshed with the accessory drive gear,
wherein the output ring gear is connected to the output shaft by a differential assembly disposed between the accessory drive gear and the input driven gear.

2. The integrated drive generator of claim 1, wherein the pump gear is a spur gear.

3. The integrated drive generator of claim 2, wherein the pump gear comprises:
   an outside diameter; and
   a pitch diameter,
   wherein a ratio of the outside diameter and the pitch diameter is 1.027 to 1.029.

4. The integrated drive generator of claim 2, wherein the pump gear further comprises:
   a root diameter,
   wherein a ratio of the root diameter and the pitch diameter is 0.957 to 0.962.

5. The integrated drive generator of claim 4, wherein the pump gear further comprises:
   a center hub, the center hub comprising:
      a hub outer diameter; and
      a hub hole extending through a center of the hub along a center axis of the pump gear,
      wherein a ratio of the hub outer diameter and the outside diameter of the pump gear is 0.242 to 0.251.

6. The integrated drive generator of claim 5, wherein the hub hole includes a double D cross-sectional profile with two flat sides and two rounded sides, wherein the two flat sides define a hub hole width and the two rounded sides define a hub hole diameter.

7. The integrated drive generator of claim 6, wherein a ratio of the hub hole diameter and the hub outer diameter is 0.622 to 0.647.

8. The integrated drive generator of claim 7, wherein the pump gear comprises at least seventy teeth.

9. The integrated drive generator of claim 8, wherein a ratio of an axial width of the teeth and an axial width of the hub is 0.532 to 0.580.

* * * * *